(12) United States Patent
Horn et al.

(10) Patent No.: US 8,078,745 B2
(45) Date of Patent: Dec. 13, 2011

(54) METHOD AND DEVICE FOR CONTROLLING THE TRANSMISSION AND PLAYBACK OF DIGITAL SIGNALS

(75) Inventors: Raymond Horn, Berlin (DE); Andreas Korpas, Berlin (DE); Reginald Grünenberg, Berlin (DE)

(73) Assignee: AUDIANTIS GmbH, Berlin (DE)

( * ) Notice: Subject to any disclaimer, the term of this patent is extended or adjusted under 35 U.S.C. 154(b) by 2629 days.

(21) Appl. No.: 10/433,856

(22) PCT Filed: Dec. 6, 2001

(86) PCT No.: PCT/DE01/04679
§ 371 (c)(1),
(2), (4) Date: Jul. 31, 2003

(87) PCT Pub. No.: WO02/47354
PCT Pub. Date: Jun. 13, 2002

(65) Prior Publication Data
US 2004/0148157 A1 Jul. 29, 2004

(30) Foreign Application Priority Data
Dec. 8, 2000 (DE) .................................. 100 62 514

(51) Int. Cl.
*G06F 15/16* (2006.01)
(52) U.S. Cl. ........................................................ 709/231
(58) Field of Classification Search .................. 709/203, 709/231, 219
See application file for complete search history.

(56) References Cited

U.S. PATENT DOCUMENTS

| | | | |
|---|---|---|---|
| 5,734,119 A | 3/1998 | France et al. | |
| 6,009,410 A | 12/1999 | LeMole et al. | |
| 6,314,565 B1* | 11/2001 | Kenner et al. | 717/171 |
| 6,327,689 B1* | 12/2001 | Tian | 714/751 |
| 6,711,622 B1* | 3/2004 | Fuller et al. | 709/231 |
| 2002/0099764 A1* | 7/2002 | Stern | 709/203 |
| 2005/0210120 A1* | 9/2005 | Yukie et al. | 709/217 |
| 2006/0015904 A1* | 1/2006 | Marcus | 725/46 |
| 2006/0224666 A1* | 10/2006 | Allen | 709/203 |

FOREIGN PATENT DOCUMENTS

DE 198 42 803 3/2000
DE 100 62 514 6/2002

* cited by examiner

*Primary Examiner* — Philip Chea
(74) *Attorney, Agent, or Firm* — Andrew Wilford

(57) ABSTRACT

The transmission and playback of digitally coded signals is done by storing files of the digitally coded signals in a data source and sending profiles of the files from the data source to an interface at a remote user. The user interface sends to the data source a control command for preparing the signals and requesting at least one of the files. In response to the control command, the data source prepares the signals in the source by sequentially selecting the requested file, decomposing the selected file into individual data packets, digitally mixing the individual data packets into at least one new data packet, and coding the new data packet in a fixed time grid and transmitting it to the user interface in real time. Finally the received new data packet with is received and played back by the interface at the user.

11 Claims, 3 Drawing Sheets

Fig. 1 (State of the Art Shockwave/Flash-Plugin)

Fig. 2 (State of the art-Streaming)

METHOD AND DEVICE FOR CONTROLLING THE TRANSMISSION AND PLAYBACK OF DIGITAL SIGNALS

CROSS REFERENCE TO RELATED APPLICATIONS

This application is the US national phase of PCT application PCT/DE01/04679, filed 6 Dec. 2001, published 13 Jun. 2002 as WO 2002/047354, and claiming the priority of German patent application 10062514.2 itself filed 8 Dec. 2000.

FIELD OF THE INVENTION

The invention relates to a method of controlling the transmission and reproduction of coded digital signals, especially compressed sound signals, music signals and/or voice signals, which are held in readiness in one or more data servers for recall by one or more control commands through one or more playback devices (users).

The invention also relates to a device for carrying out the method of controlling the transmission and reproduction of coded digital signals between at least two electric devices (receiving device and server) through a data transmission connection and its reproduction.

BACKGROUND OF THE INVENTION

The typical use of the invention is the completion of internet pages with interactive audio content. Internet pages, as is known, are comprised of HTML files which determine the layout and, optionally, of image files. These files are primarily prepared by http servers which are connected with the internet. The files are compiled and displayed with html browsers, especially "Netscape Navigator" from the firm Netscape or "Internet Explorer" from the firm Microsoft. The browser downloads all files from the internet and displays them subsequently on the monitor of the user.

This known state of the art is only limitedly suitable for the transmission of audio signals or video signals since the quantity of data to be transmitted is too great and must be integrated in the internet pages to be displayed. The loading time for a background sound or a radio transmission with a play time of an unending duration without repetition, leads to a loading time which is of limitless duration before a reproduction can commence.

This state of the art is integrated in present day web browsers by small programs, so-called plug-ins, like for example, the "Shockwave/Flash-Plug-In." These enable extensive 3D animation and vector graphics to be displayed in addition to sound and music reproduction. For that purpose, however, the entire contents which are to be displayed, in conjunction with an internet page for the user, must be integrated in this internet page, including for example eighty different sound data when the user is to be presented with eighty different surfaces of the display pages with different sounds, for example, button sounds. All of this data must be previously loaded independently of whether the user will actually select them.

Another method (U.S. Pat. Nos. 5,734,199, 6,009,410) seeks to avoid such long loading times through the use of so-called "streaming," in which the already received audio data and video data are continuously reproduced while the next data are received. The display of the internet page and the playback of the audio stream and video stream are effected completely independently from one another. This quasi parallel reproduction of image and sound is however associated with the drawback that for the playback of the stream, an external player is required in addition to the browser. Furthermore, the audio stream and/or the video stream can either be uncontrollable in an interactive manner through the internet page or can only be controlled to a limited degree in an interactive way over the internet page. As a consequence, the player provides an additional user interface. With the latter however, only the reproduction in the receiving device is controlled. The control possibilities for previously obtained data in the source is limited to a starting and stopping of the data stream.

Furthermore, such plug-ins and players can only function once a downloading and installation by the user has been achieved and that can be a difficulty. The downloading and installation process is often very complicated and may exceed the capacity of the user. Should the downloading of a plug-in or a player by the user be defective, there is the drawback that part of the internet page may not function and the user may not be able to use the internet to a significant extent. Many internet providers thus supply two versions of their internet page, one with and one without use of Flash. For the web designer the handling of the plug-in and player is also expensive and complicated. Flash can only be used with a special tool which must be incorporated in the internet page. In the case of internet pages embodying author systems, whose content may be varied, Flash must be matched with the aid of the tools.

This work is very time consuming and generally gives rise to an avoidance of such plug-ins.

OBJECT OF THE INVENTION

In this state of the art, the invention has as its object to provide control of the transmission and reproduction of digital signals, especially sound signals, music signals and voice signals directly by the user in the source maintaining the data in readiness while avoiding extensive installation processes.

SUMMARY OF THE INVENTION

This object is achieved by the method for the purposes described at the outset with the characterizing features of claim 1 and by the device with the characterizing features of claim 13. Advantageous refinements of the method and the device are ascertainable from the dependent claims.

The method of the invention is characterized above all in that it makes possible for the first time the reproduction of audio files and video files through the internet with active control. The requisite data for the real time reproduction of, for example, sound, music and voice are not components of the internet page and thus they need not be previously transmitted in a time-consuming manner. Instead they are communicated from the server only when reproduction is desired. All of the expansions required for the playback of the audio data are in readiness at the server from the internet when the user calls up the internet page. The user is no longer required to install corresponding expansions on his computer. The audio stream is interactively set up for the user in that all commands generated by the user, for example, the clicking of a mouse button or the movement of the mouse cursor over a button or link results in the playback of certain music, a tone or voice. The provider of an internet page must make available the possibility of communicating actively completable information, for example, the fading in of an advertising spot.

Through the method of the invention it is possible for the web designer to provide the possibility of equipping an internet page with musical tones, music and voice at different locations on the page without detriment to the transmission speed and the display speed. The device of the invention for carrying out the method is of simple construction and does not require any separate installation process by the user.

BRIEF DESCRIPTION OF THE DRAWING

Further advantages and details are given in the following description with reference to the appended drawing. The invention will be described in greater detail with reference to two embodiments. The drawing shows:

FIG. 1 the integration of sound and video in an internet page according to the state of the art by means of a plug-in;

SPECIFIC DESCRIPTION

Figure 1:
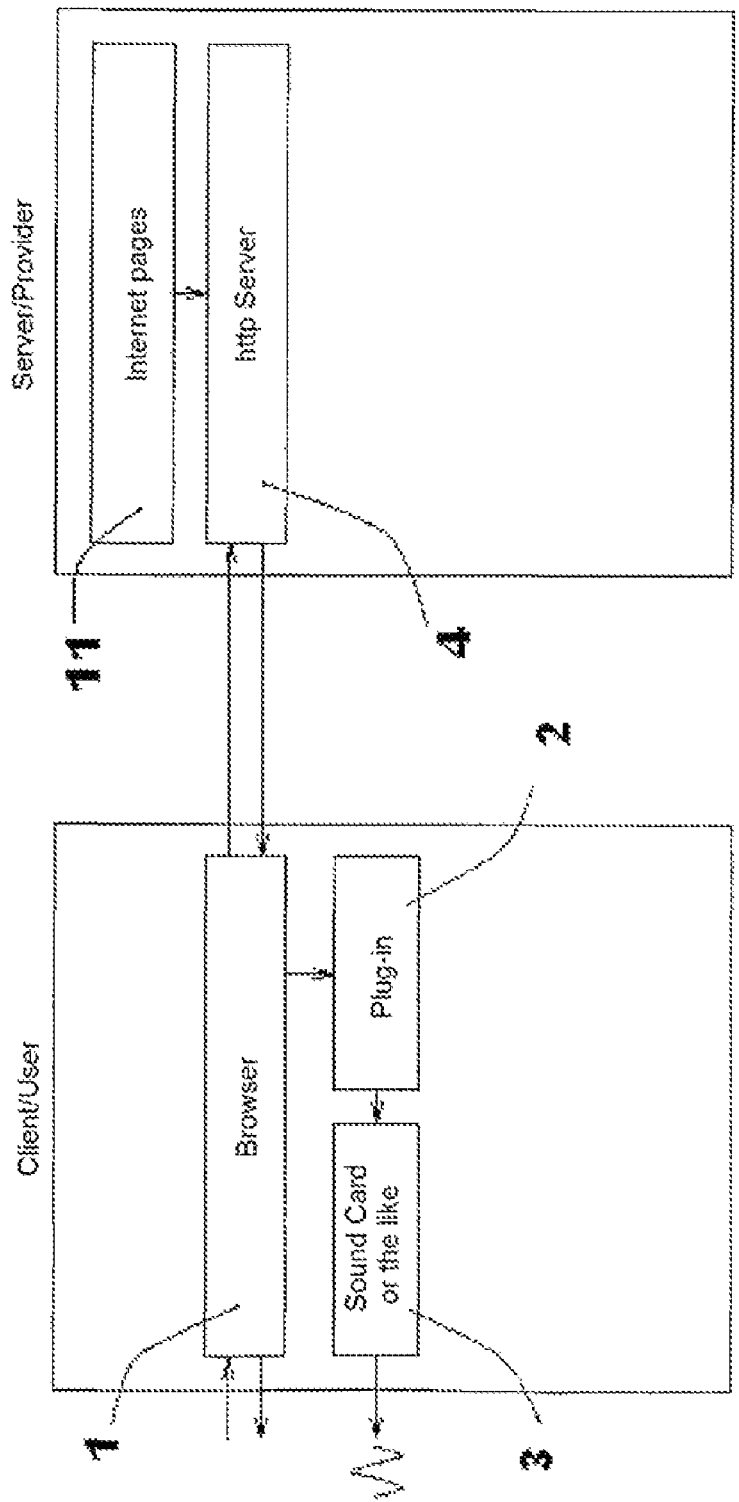

FIG. 1 shows the integration of sound signals and video signals in accordance with the state of the art in commercial web browsers using small programs, the so-called plug-ins 2 like, for example, the "Shockwave/Flash-Plug-In." These enable 3D animation and display of vector graphics as well as the reproduction of sound and music through interfaces, for example, a sound card 3 in the personal computer. The illustration in FIG. 1 is limited for the sake of simplicity to the reproduction of music. For that purpose however the entire content to be displayed for the user in an internet page 11 must be integrated in this internet page. All of these data are previously loaded, independently of whether or not the user has selected them. If the user, who has installed a corresponding plug-in, selects an internet page through his internet browser 1, this internet page is selected by the http server 4 from the internet pages 11 of the server and transmitted to the browser 1. The browser 1 transmits the data which is required for processing by the plug-in to the plug-in 2. Audio signals are then played through the sound card 3. For graphics animation, the corresponding animation images are calculated by the plug-in and at uniform time steps are transmitted to the browser 1 for display. This has not been illustrated in FIG. 1. Since an internet page which is supported by a flash/plug-in contains significantly more data than a comparable purely HTML file and thus requires undesirable high loading times, many website providers supply alternative websites without Flash. This gives rise to a significantly higher administration cost.

Figure 2:
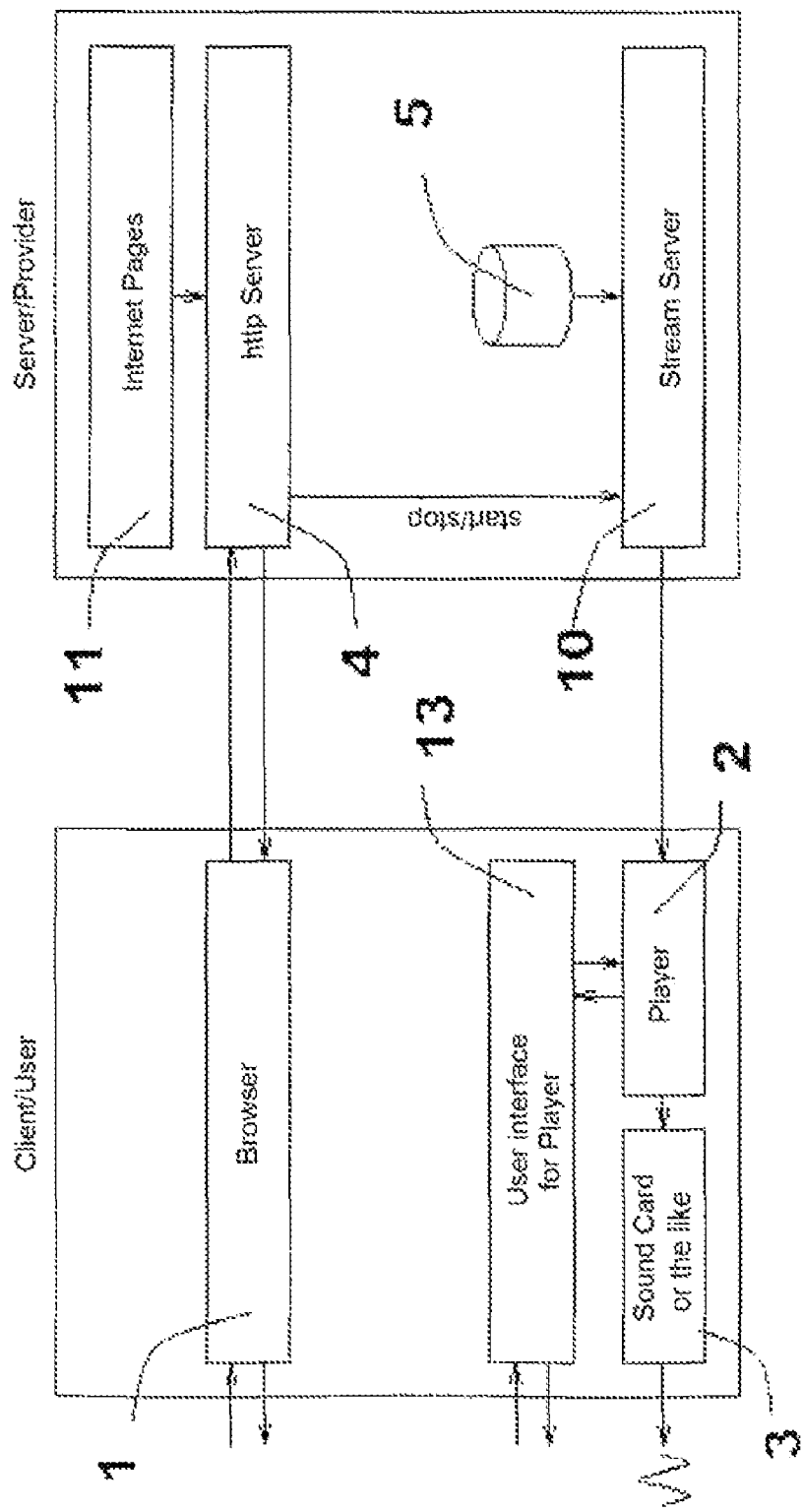
FIG. 2 the streaming of audio and video in accordance with the state of the art.

In FIG. 2 the streaming method in accordance with the state of the art has been illustrated in greater detail. The display of an internet page supplied by an http server 4 is effected here as well through an internet browser 1. The audio stream and video stream are, independently of browser 1, played back through a previously installed player 2 (FIG. 2 shows video reproduction via a sound card 3). The selection of an audio stream and/or video stream of the server 4 via nonremovable memory, typically a hard disk] 5, is effected through the internet browser from corresponding internet pages 11. A stream server 10 which contains a corresponding instruction from the http server 4 transmits the selected file stored in the hard disk] 5 in a fixed time grid in the player 2. The control possibilities of the data readied in the source via the browser 1 are limited to a starting and stopping of the data stream since the stream server 10 operates substantially as a data pump. The interactive control of the data is effected through an additional user interface 13 of the player 2. With this, however, only the reproduction in the receiving device is controlled.

Example 1

Figure 3:
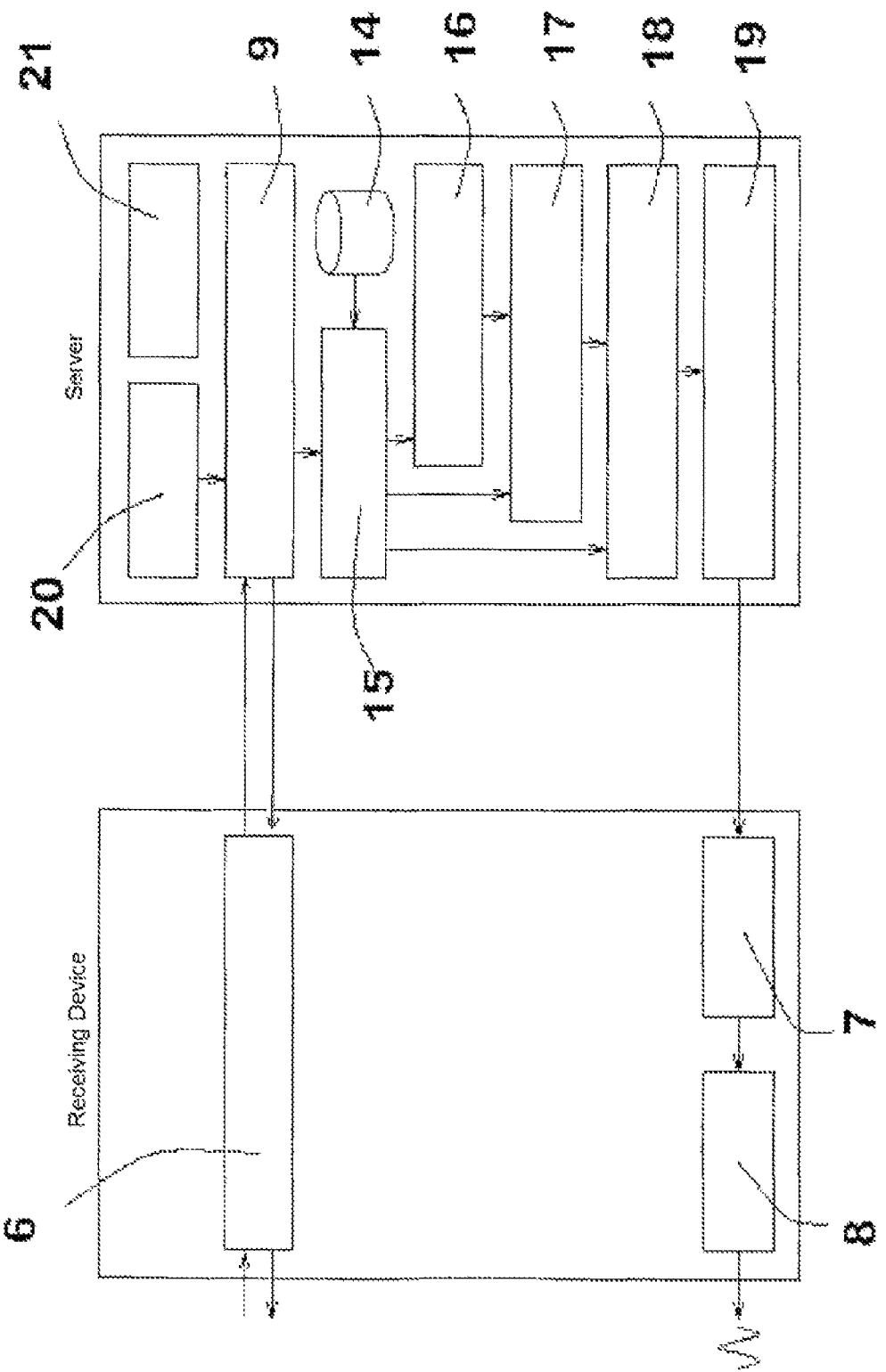
FIG. 3 a block diagram of the configuration of the device according to the invention for carrying out the method of the invention.

In the currently existing internet infrastructure the device according to the invention illustrated in FIG. 3 will be integrated.

The control interface 9 is realized in the server by an http server. This http server is accompanied by a file selection system (file server 15) for packed musical tones, sound, music and voice files (audio files), a mass storage memory] 14 (for example a nonremovable hard disk] managed by the data selection system 15, a decoder 16 for unpacking the stored audio files to a compressed packet, a decoder 18 for data compression and a stream server 19 for transmitting the packet to the user. The configurable user interface 6 in the receiving unit is realized by a conventional internet browser 1. This contains an information profile 20 defined by the server and in the form of an internet page in the HTML format communicated from the control interface 9 and thus builds the desired interface 6 for the user. With the transmission of the internet page, the control interface 9 transmits, as required also a transmittable decoder 21 which differs from the decoder 16 installed in the server and utilizes the widely accepted MP3 standard to the receiving unit in which it is automatically installed. For this purpose into the internet page a Java Script function is built in and is supported by the browser of the user. The user utilizes only the browser and the displayed internet page. The user can then, for example by movement of the mouse, give instructions which are transmitted as corresponding control commands to the control interface in the server. In the server, by means of the file selection system 15, the decoder 16, the mixer 17, the encoder 18 and the stream server 20, as components, a data stream is generated to correspond to the instructions of the user and is transmitted to the receiving device. The encoder 18 thus generates a data format which is decodable by the decoder 21 in the receiver unit, for example, MP3. The received data is transformed by the decoder 2 in the receiving device into a format which can be presented by the receiver and delivered to a corresponding output interface 8, for example, a sound card. The transmission of sound, music or a voice is effected by a coding of the audio data in a transfer format, for example MP3. Since the encoder 18 and the transmittable decoder 21 are integrated as self-standing modules in the expansion of the server, all suitable formats can be used so that with a change in the format, no change is required in the software installation in the receiving device.

Example 2

The solution to the invention is realized with a mobile receiving unit, for example a Handy. The patterned information profiles 11 stored in the server of the user interface are, in this example, the structure descriptions of a selection menu which is transmitted from the control interface, for example, a WAP server, to the receiving device. In the receiving device, the configurable user interface 6, here a WAP browser, produces the menu which is described by the patterned information profile 20. The subsequent portions of the method of the invention and the other components of the device of the invention are identical to those in Example 1. The output interface 8, for audio reproduction, is realized in the present example by the sound chip installed in the Handy. Precisely in the case of mobile applications it can be expected that intermediate devices will appear on the market which can have a decoder 7, for example, for the MP3 standard, which can then be used.

The invention claimed is:

1. A method of controlling the transmission and playback of digitally coded signals, the method comprising the steps of:
   storing files of the digitally coded signals in a data source;
   sending profiles of the files from the data source to an interface at a remote user;
   sending from the user interface to the data source a control command for preparing the signals and requesting at least one of the files;
   in response to the control command at the data source preparing the signals in the source by sequentially
      selecting the requested file,
      decomposing the selected file into individual data packets,
      digitally mixing the individual data packets into at least one new data packet, and
      coding the new data packet in a fixed time grid and transmitting it to the user interface in real time; and
   decoding and playing back the received new data packet with the interface at the user.

2. The method defined in claim 1 wherein the new data packet is encoded in accordance with an available transmission band.

3. The method defined in claim 1 wherein the data is played back at the user by switching over to a data stream of a third source.

4. The method defined in claim 1 wherein the selected files are decomposed into packets and decoded before being mixed.

5. The method defined in claim 1 wherein the control command is triggered and transferred for calling up the stored files in the data source by the user.

6. The method defined in claim 1, further comprising the step of
   transmitting decoding software to the user.

7. The method defined in claim 1, further comprising the step of
   buffering the data packets.

8. The method defined in claim 1, further comprising the step of
   reproducing the digital signals of the files in a representation format for the user.

9. An apparatus for controlling the transmission and playback of digitally coded signals, the apparatus comprising:
   a data source holding files of the digitally coded signals;
   a remote user having an interface;
   means in the data source for sending profiles of the files to the remote interface;
   means in the interface for sending to the data source a control command requesting at least one of the files;
   means in the user for responding to the control command at the data source and sequentially
      selecting the requested file,
      decomposing the selected file into individual data packets,
      digitally mixing the individual data packets into at least one new data packet, and
      coding the new data packet in a fixed time grid and transmitting it to the user interface in real time; and
   means in the user decoding and playing back the received new data packet with the interface at the user.

10. The apparatus defined in claim 9 wherein the data source is a server.

11. The apparatus defined in claim 9 wherein the means in the user for decoding and playing back includes a sound card.

* * * * *